(12) United States Patent
Lee et al.

(10) Patent No.: US 7,185,533 B2
(45) Date of Patent: Mar. 6, 2007

(54) MULTI-FUNCTION DETECTING PEN

(75) Inventors: Tzong-Sheng Lee, Miaoli Hsien (TW); Jeng-Long Ou, Hsinchu Hsien (TW)

(73) Assignee: Unimems Manufacturing Co., Ltd., Hsinchu (TW)

( * ) Notice: Subject to any disclaimer, the term of this patent is extended or adjusted under 35 U.S.C. 154(b) by 126 days.

(21) Appl. No.: 11/149,294

(22) Filed: Jun. 10, 2005

(65) Prior Publication Data

US 2006/0277989 A1    Dec. 14, 2006

(51) Int. Cl.
*E01C 23/00*    (2006.01)
(52) U.S. Cl. .......................... 73/146; 73/23.2; 324/464
(58) Field of Classification Search ................. 73/146, 73/146.2, 146.3, 146.4, 146.5, 146.8, 23.2; 324/464

See application file for complete search history.

(56) References Cited

U.S. PATENT DOCUMENTS

| | | | | |
|---|---|---|---|---|
| 4,617,821 A | * | 10/1986 | Yokoyama et al. | .......... 73/23.3 |
| 5,496,740 A | * | 3/1996 | Williams | ................... 436/132 |
| 2003/0052692 A1 | * | 3/2003 | Lin | ............................ 324/464 |

* cited by examiner

*Primary Examiner*—Jewel Thompson
(74) *Attorney, Agent, or Firm*—Rosenberg, Klein & Lee

(57) ABSTRACT

A multi-function detecting pen is described. The multi-function detecting pen includes a head module, a detecting chips module, a power module, a lighting module, and a control module. The head module is disposed at a front portion of the pen and the detecting chips module is followed. The detecting chips module may include at least one pressure detecting chip for measuring a pressure, e.g. tire pressure, and/or a gas detecting chip for measuring a gas concentration, e.g. alcohol concentration. The detecting chips module may further include a temperature detecting chip for measuring a temperature, e.g. ambient temperature or tympanum temperature. The head module may further include a switchable or a replaceable adapter for coupling to the corresponding object and keeping the head module clean.

20 Claims, 4 Drawing Sheets

MULTI-FUNCTION DETECTING PEN

BACKGROUND OF THE INVENTION

1. Field of Invention

The invention relates to a pen detector and, in particular, to a multi-function detecting pen.

2. Related Art

With the progress in electronic detecting technology, various detecting devices are available. For example, the gas detector for detecting alcohol concentration has been used to quickly detect the alcohol concentration of drivers to avoid drivers from driving at a high alcohol concentration. The pressure detector is used to quickly detect the pressure in tires for the safety of driving.

However, large detectors are not suitable for drivers or even normal users. Therefore, compact and portable detecting systems, such as the tire pressure meter, tympanum temperature gun, and alcohol detecting pen have been developed. Even though they are different in design, they are all designed to be portable and easy to use.

For a driver, it is highly desirable to be able to know the tire condition at all times as well as to know his/her alcohol concentration. This helps avoiding dangers. In this case, a careful driver has to carry detectors that can measure the tire pressure and alcohol concentration. The individual measuring devices are inconvenient in use and require a higher cost.

SUMMARY OF THE INVENTION

In view of the foregoing, the invention aims at providing a convenient and effective integrated measuring device to improve the driving safety and the portability of the device.

An object of the invention is to provide a multi-function detecting pen that can increase the road driving safety and be carried along for measurements at any time.

Another object of the invention is to provide a multi-function detecting pen with the functions of measuring the pressure and/or gas concentration, as well as measuring the tympanum temperature. Devices with multiple functions are effectively integrated in a single pen structure for the user's convenience in carrying.

According to the above-mentioned objects, the invention provides a multi-function detecting pen with the appearance of a pen. The multi-function detecting pen includes a head module, a detecting chips module, a power module, and a control module.

The head module is disposed at a front portion of the pen and the detecting chips module is followed, including detecting chips and a detecting substrate. The detecting substrate and the head module form a measuring cavity. The detecting chips module may include at least one pressure detecting chip for measuring a pressure, e.g. tire pressure, and/or a gas detecting chip for measuring a gas concentration, e.g. alcohol concentration. The power module and the detecting chips module are electrically coupled to provide the power needed by the detecting chips module. The control module is electrically coupled to the detecting chips module and the power module to switch among different measuring chips.

The head module can further include a removable tire pressure detecting adapter to be coupled with the tire nozzle. The head module may further include a side air inlet, which is normally closed. When measuring the alcohol concentration, one can rotate the head to open this side air inlet for breathing air into the inlet. The detecting chips module may further include a temperature detecting chip for measuring a temperature, e.g. ambient temperature or tympanum temperature. It can be replaced by a removable pen adapter.

The detecting chips module may further include a moisture detecting chip to measure the moisture. The multi-function detecting pen further includes a light bulb, preferably made of a light-emitting diode (LED) or a color LED. It is electrically coupled to the power module and the control module to provide illumination. The light bulb can be disposed at a tail portion or in the middle portion of the multi-function detecting pen. A light guiding body may be used to guide the light emanated from the light bulb to the head module. With the control module, the light bulb may have the function of providing message display.

The control module further contains a control circuit board, a liquid crystal display (LCD) panel, a control button, and an integrated circuit (IC). The control button is used to select a measuring function of the multi-function detecting pen. The IC further includes a time IC, preferably with an alarm function. The control module may further include a sounding element.

The disclosed multi-function detecting pen has different embodiments. It has a pen appearance for the convenience of carrying. The multi-function detecting pen may include the functions of measuring pressure and temperature, along with the functions of time and alarm. The multi-function detecting pen may as well have the functions of measuring temperature and moisture, along with the functions of time and alarm. The multi-function detecting pen may as well have the functions of measuring tympanum temperature and ambient temperature, along with the functions of time and alarm. The multi-function detecting pen is preferably to include all the detecting functions mentioned above as well as the functions of time and alarm.

Therefore, the disclosed multi-function detecting pen can convenient and quickly perform various kinds of measurements. Using the pen structure, it is convenient to carry and has a lower production cost. It helps to make the detecting device more popular, improving the driving safety and portability.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

The present invention will be apparent from the following detailed description, which proceeds with reference to the accompanying drawings, wherein the same references relate to the same elements.

The disclosed multi-function detecting pen is convenient for the user to carry for measurements at any time. It is provided with different measuring devices in a single pen structure to enhance its functions.

Figure 1:
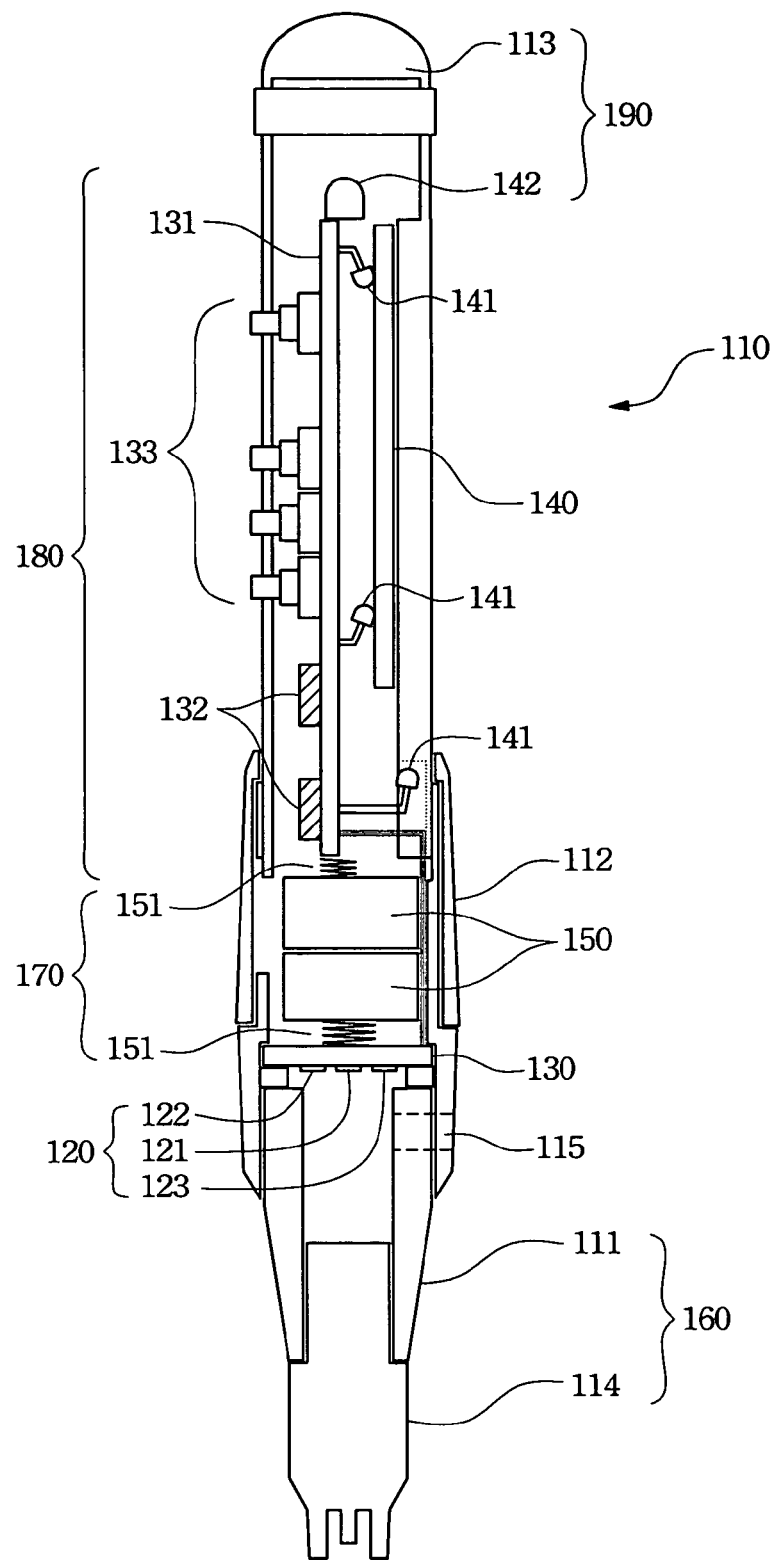
FIG. 1 is a schematic view of the multi-function detecting pen according to an embodiment of the invention.

With reference to FIG. 1, the multi-function detecting pen 110 includes a head module 160, a detecting chips module 120, a power module 170, and a control module 180. The head module 160 includes a head 111 and a tire pressure detecting adapter 114. It may include a side air inlet 115 that can be opened or closed for measuring various quantities. In particular, the inlet 115 can be disposed on a removable adapter. The detecting chips module 120 includes a pressure detecting chip 122 and a gas detecting chip 123, fixed on a detecting substrate 130 to measure tire pressure and alcohol concentration. The detecting chips module 120 may further include a temperature detecting chip 121 for measuring a temperature, e.g. ambient temperature or tympanum temperature.

The opening of the detecting portion is roughly on the axis of the head 111. The temperature measurement can be performed in a contact or non-contact way without departing from the spirit of the invention. The temperature detecting chip 121 is preferably disposed in the middle of the detecting substrate 130 to align with the opening of the head 111. The pressure detecting chip 122 and the gas detecting chip 123 are disposed on both sides. The disclosed multi-function detecting pen utilizes the micro-electromechanic (MEM) technology to effectively integrate the pressure detecting chip, the temperature detecting chip, the gas detecting chip, and even the moisture detecting chip on a very small area for measurements of various quantities. To further reduce the production cost and to reserve extra space for other detecting chips, the detecting chips need not to be packaged but are directly installed on a small detecting substrate. Non-conducting glue is used to effectively protect the bonding wires. The gas detecting chip may detect different gases, e.g. the fuel gas, carbon monoxide, or carbon dioxide. In addition to measuring the body temperature and the tympanum temperature, the temperature detecting chip can also be used to measure the ambient temperature.

The detecting substrate 130 is followed by the power module 170, which preferably contains a spring 151, a battery 150, and a battery room cover 112. When replacing the battery 150, the battery room cover 112 is rotated open. The battery 150 and the spring 151 are in electrical contact for the multi-function pen 110 to perform all kinds of measurements.

The power module 170 is followed by the control module 180, which is preferably comprised of a control circuit board 131, a control button 133, and an IC 132. The control circuit board 131 and the IC 132 provide the necessary circuit for signal processing and control. The control button 133 is used to control the required operations. The control module 180 is followed by the lighting module 190, which is preferably comprised of a tail portion 113 and a light bulb 142. The light bulb 142 is preferably a large-power LED or color LED. The tail portion 113 converges the light to provide illumination.

The control module 180 may further include an LCD panel 140 and an indicator 141 for the user to select functions and watch measurement results. The indicator 141 is disposed on one side or on the back of the LCD panel 140 to provide the necessary illumination. The indicator 141 is preferably an LED. The indicator can be defined to have an alarming function to emit light in different alarming modes according to the measured data. For example, it may flash differently or emit light of different colors. The large-power light bulb 142 at the tail portion 113 can also be designed to provide the alarms after measurements. The control module 180 may use a sounding element, such as a speaker, to provide alarms.

Figure 2:
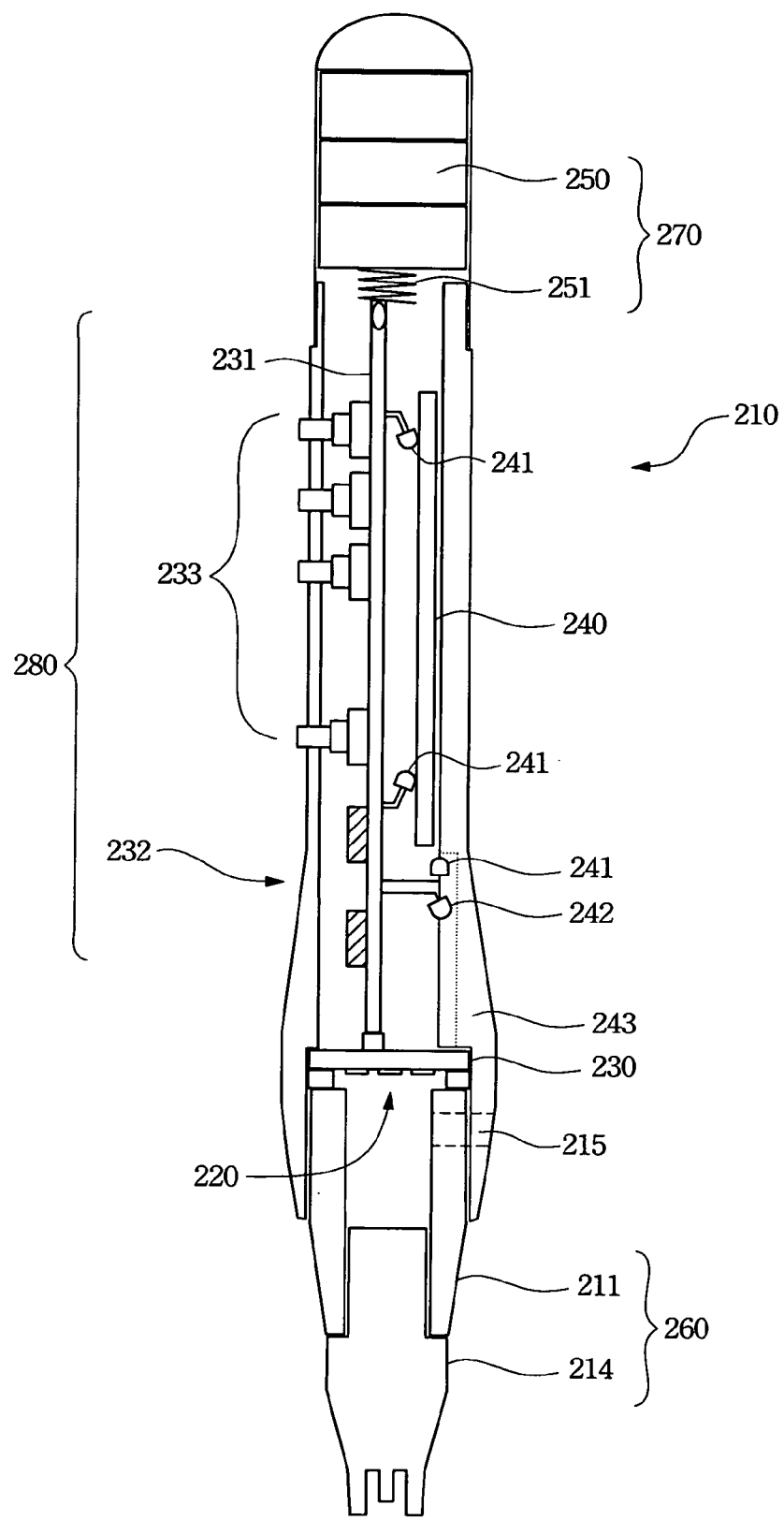
FIG. 2 is a schematic view of the multi-function detecting pen according to another embodiment of the invention.

FIG. 2 shows the cross-sectional view of another embodiment of the multi-function detecting pen 210. It contains a head module 260, a detecting chips module 220, a power module 270, and a control module 280. The head module 260 includes a head 211 and a tire pressure detecting adapter 214. It may also include a side air inlet 215 that can be opened or closed for various kinds of measurements. In particular, the air inlet 215 can be disposed on a removable adapter for the convenience of measurements. The detecting chips module 220 includes a pressure detecting chip and a gas detecting chip, fixed on a detecting substrate 230 to measure the tire pressure and alcohol concentration. As in FIG. 1, the detecting chips module 220 may further include a temperature detecting chip to measure the temperature.

The detecting substrate 230 is followed by the control module 280. The control module 280 is also preferably comprised of a control circuit board 231, a control button 233, and an IC 232. In this embodiment, the power module 270 contains a spring 251 and a battery 250, installed behind the control module 280 for the convenience of battery replacement.

The multi-function detecting pen 210 further includes a light bulb 242, which is preferably a large-power LED or color LED. The emitted light is guided by a light-guiding body 243 to converge in the direction of the head 211. When the user uses it to make measurements, the light bulb 242 illuminates the measured part of the object. The control module 280 may also include an LED panel 240 and indicator 241 for the user to select functions and watch measurement results. In particular, the indicator 241 is installed on the side or back of the LCD panel 240 to provide the necessary illumination. In addition to the necessary illumination for the LCD panel 240, the indicator 241 is preferably comprised of an LED or a color LED with an alarming function. After each measurement, the indicator can emit light in different alarming modes. Likewise, the light bulb 242 can be designed to provide the alarming function too.

Figure 3:
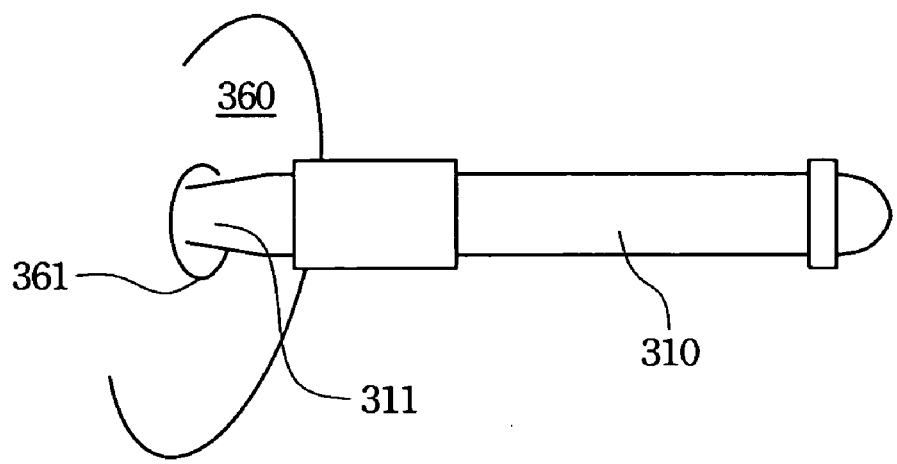
FIG. 3 shows an embodiment of using the disclosed multi-function detecting pen to measure the tympanum temperature.

FIG. 3 shows how the multi-function detecting pen 310 is used to measure the tympanum temperature. It is preferable to take the tire pressure adapter off the head 311 before putting the head 311 into the ear channel 361 of the ear 360.

Figure 4:
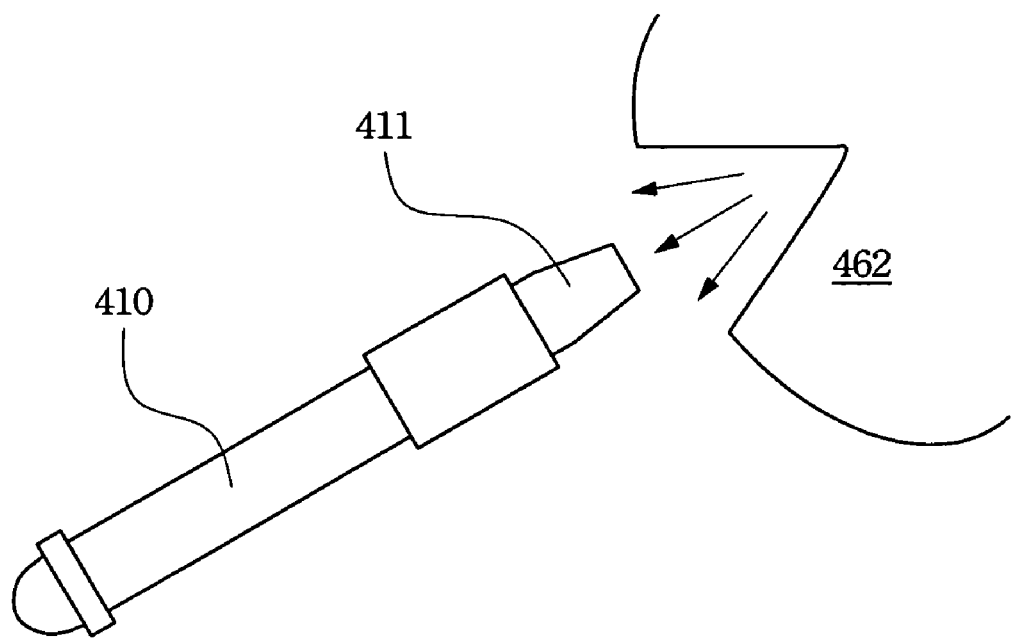
FIG. 4 shows an embodiment of using the disclosed multi-function detecting pen to measure the alcohol concentration.

FIG. 4 shows how the multi-function detecting pen 410 is used to measure the alcohol concentration. In this case, the head 411 of the multi-function detecting pen 410 is pointed to the mouth 462 for blowing in air. One may open the side air inlet of the head to blow in air too.

Figure 5:
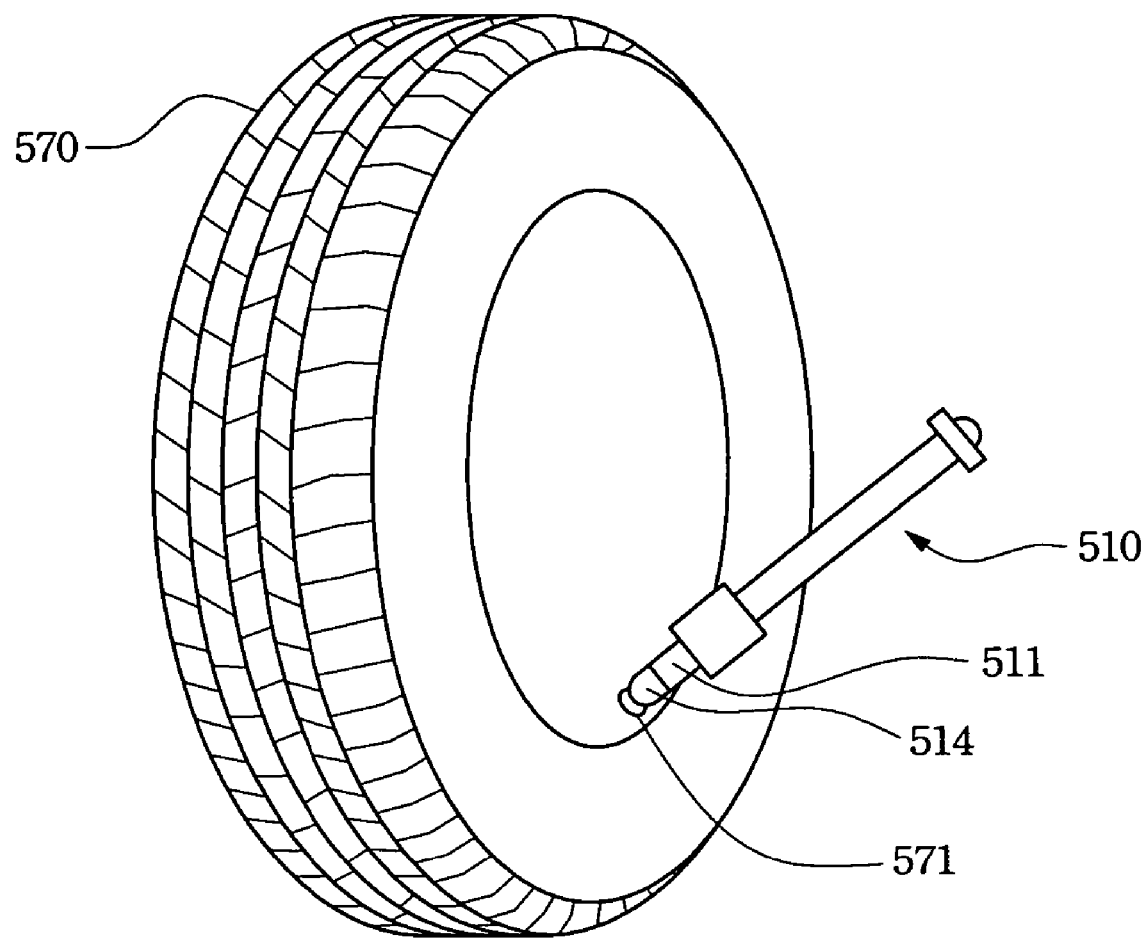
FIG. 5 shows an embodiment of using the disclosed multi-function detecting pen to measure the tire pressure.

FIG. 5 shows how the multi-function detecting pen 510 is used to measure the tire pressure of a tire 570. First, the tire pressure adapter 514 installed on the head 511 of the multi-function detecting pen 510 is aligned with the nozzle 571 of the tire 570. One then presses the multi-function detecting pen 510 against the nozzle 571 so that the pressure of the tire 570 is directed to the pressure detecting chip in the back, thereby determining the tire pressure.

The disclosed multi-function detecting pen can integrate a pressure detecting chip, a power module, and a control module together into one that has the functions of measuring pressure and displaying time. The control module is preferably an IC that can provide time display and alarm function. The disclosed multi-function detecting pen can also integrate a gas detecting chip (e.g. for detecting alcohol concentration), a power module, and a control module together into one that has the functions of measuring alcohol concentration and displaying time. The control module in this case is also preferable with an IC to provide time display and alarm function. Since the disclosed multi-function detecting pen has a portable size and appearance, the user can use it to perform various kinds of measurements.

The invention uses a pen structure to integrate pressure and gas detecting chips, so that the driver can perform both tests with only such a detecting pen. The detecting chips module may further include a temperature detecting chip so as to measure the pressure, temperature, and gas concentration. The detecting end for the input of pressure, gas, and temperature is disposed at the head. The detecting chips module in the head may contain pressure and gas detecting chips. One may even integrate pressure, temperature, gas, and moisture detecting devices into a single chip or integrate several chips in one module on one substrate. In particular, the control circuit module may include a time IC and a sounding device to provide the function of time and alarm. Therefore, in addition to the display of detecting values and system settings, the LCD panel can also display time.

Using the disclosed multi-function detecting pen, the drivers can conveniently carry a single detecting pen to perform multiple measurements. This does not only increase the driving safety, but also lowers the device cost, making the product more competitive on the market.

The size, shape, and number of elements in the attached drawings are for illustration purposes only. They should not be used to limit the scope of the invention. Increasing or decreasing the number, size, or shape of the elements will not depart from the spirit and scope of the invention.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A multi-function detecting pen, comprising:
   a head module, disposed at a front portion of the pen;
   a detecting chips module, including a tire pressure detecting chip, an alcohol detecting chip, and a detecting substrate following the head module, forming a measuring cavity between the head module and the detecting chips module;
   a control module disposed in a pen body and electrically coupled to the detecting chips module for driving and controlling the detecting chips module in measurements; and
   a power module electrically coupled to a circuit board of the control module to provide power needed by the multi-function detecting pen.

2. The multi-function detecting pen of claim 1, wherein the pen module further contains a side air inlet with a mechanism to open and close.

3. The multi-function detecting pen of claim 1 further comprising a lighting device electrically coupled to the power module and the control module to provide the functions of illumination and warning.

4. The multi-function detecting pen of claim 3, wherein the lighting device is disposed in the pen body, the pen body being transparent with a structure to guide the light toward the head module.

5. The multi-function detecting pen of claim 1, wherein the control module includes a control circuit board, a liquid crystal display (LCD) panel, a control button, and an integrated circuit (IC), the control button being provided to set and select one detecting function from the multi-function detecting pen.

6. The multi-function detecting pen of claim 5, wherein the IC has the functions of time display and alarming.

7. The multi-function detecting pen of claim 5, wherein the control module includes a sounding device.

8. A pressure detecting pen, comprising:
   a head module, disposed at a front portion of the pen;
   a detecting chips module, including a pressure detecting chip and a detecting substrate following the head module, forming a measuring cavity between the head module and the detecting chips module;
   a control module disposed in a transparent pen body and electrically coupled to the detecting chips module for driving and controlling the detecting chips module in measurements;
   a power module electrically coupled to a circuit board of the control module to provide power needed by the pressure detecting pen; and
   an illumination module, including the transparent pen body and a lighting device, the transparent pen body guiding the light emitted by the lighting device toward the head module.

9. The pressure detecting pen of claim 8, wherein the control module includes a control circuit board, an LCD panel, a control button, and an IC, the control button being provided to set and select one detecting function from the multi-function detecting pen.

10. The pressure detecting pen of claim 9, wherein the IC has the functions of time display and alarming.

11. The pressure detecting pen of claim 8, wherein the pressure detecting chip further integrates a temperature detecting chip for measuring both pressure and temperature.

12. A multi-function detecting pen, comprising:
   a head module, disposed at a front portion of the pen;
   a detecting chips module, including a detecting chip and a detecting substrate following the head module, forming a measuring cavity between the head module and the detecting chips module;
   a control module disposed in a pen body and electrically coupled to the detecting chips module for driving and controlling the detecting chips module in measurements; and
   a power module electrically coupled to a circuit board of the control module to provide power needed by the multi-function detecting pen.

13. The multi-function detecting pen of claim 12, wherein the detecting chip module includes a pressure detecting chip, a moisture detecting chip, a temperature detecting chip, and a gas detecting chip.

14. The multi-function detecting pen of claim 13, wherein the gas detecting chip includes an alcohol detecting chip, a carbon monoxide detecting chip, a carbon dioxide detecting chip, and a gas detecting chip.

15. The multi-function detecting pen of claim 12, wherein the head module includes a removable detecting adapter having a side air inlet with a mechanism to open and close.

16. The multi-function detecting pen of claim 12, wherein the head module includes a removable pen head for normal writing.

17. The multi-function detecting pen of claim 12 further including a lighting device electrically coupled to the power module and the control module to provide the functions of illumination and warning.

18. The multi-function detecting pen of claim 12, wherein the control module further includes a control circuit board, an LCD panel, a control button, and an IC, the control button being provided to set and select one detecting function from the multi-function detecting pen.

19. The multi-function detecting pen of claim 18, wherein the IC has the functions of time display and alarming.

20. The multi-function detecting pen of claim 18, wherein the control module further includes a sounding device.

* * * * *